June 28, 1955

C. J. STRAKA 2,711,982

METHOD OF MAKING ROLLED PHENOLIC
RESIN-BONDED PAPER TUBING
Filed Feb. 21, 1951

WITNESSES:
E. A. McCloskey.
Wm. L. Groome

INVENTOR
Cyril J. Straka.
BY
Frederick Shapoe
ATTORNEY 2,711,982

METHOD OF MAKING ROLLED PHENOLIC RESIN-BONDED PAPER TUBING

Cyril J. Straka, Wilkinsburg, Pa., assignor to Westinghouse Electric Corporation, East Pittsburgh, Pa., a corporation of Pennsylvania Application February 21, 1951, Serial No. 212,070

2 Claims. (Cl. 154—83)

This invention relates to high-density rolled laminated tubing composed of paper and applied phenolic resin and processes for producing the same.

Up to the present time, laminated paper base-phenolic resin tubing has been manufactured almost entirely by one of two processes. One process, producing what is called "rolled" tube, comprises rolling on a steel mandrel paper carrying B-stage phenolic resin with as much pressure as can be applied without tearing the paper and placing the rolled paper and mandrel assembly into an oven where a sufficient temperature is applied to cause the phenolic resin to fuse and then solidify into a C-stage phenolic resin, thereby bonding the paper laminations into a whole. Rolled tubing so made is characterized by good concentricity and uniformity of appearance and mechanical properties. However, the density or specific gravity of such tubing varies from 1.25 to 1.29. The moisture absorption of such tubing, after immersion in water for 24 hours, is of the order of 3% to 3½% and higher.

The second process in use in the art at present is a "molded" tube process wherein paper treated with a B-stage phenolic resin is wrapped on a steel mandrel and the mandrel is put in a hot press provided with dies having pairs of superposed hemi-cylindrical cavities in one of which is placed the wrapped mandrel so that when the press is operated the cavities approach each other and compress the wrapped paper about the mandrel. After heating the wrapped paper tubing in the press for a sufficient period of time to convert the phenolic resin to the C stage, the press is opened and the mandrel with the fully cured laminated tube thereon is withdrawn. However, there is unavoidably formed a seam or a flash between the cavities of the dies, and the paper, particularly the outer layers, is distorted at the seam. The molded tube must then be machined considerably to remove the seam and to provide a smooth outer surface. The mechanical strength and concentricity of this tube are inferior to those of the rolled tube. However, the density of the molded tube will vary from 1.33 to 1.35. Furthermore, the water absorption of this molded tube will vary from about 1.8% to 2%.

Both of these two forming processes are well known and described in the art, as, for example, on page 685 of the 1948 issue of the Modern Plastics Encyclopedia.

The rolled tube is much simpler to make, and since it requires no high-pressure press and costly dies, of which a separate die set is required for every different diameter of tube, it, therefore, is much cheaper to produce. For electrical applications, however, and other uses where moisture absorption results in a deterioration of dielectric strength and other properties, it has been necessary to produce the tubes by the molded process in spite of the much higher cost and inferior physical and appearance properties.

The object of this invention is to provide a rolled laminated tube composed of paper and applied binding phenolic resin with a density of over 1.30 and low moisture absorption.

A further object of the invention is to provide a novel process for producing a rolled tubular member of a density of above 1.30 by wrapping paper treated with certain phenolic resins on a suitable mandrel and curing without the use of external pressure to produce the tubing.

Other objects of the invention will in part be obvious and will in part appear hereinafter. For a better understanding of the nature and objects of the invention, reference should be had to the following detailed description and drawing in which.

Figure 1:
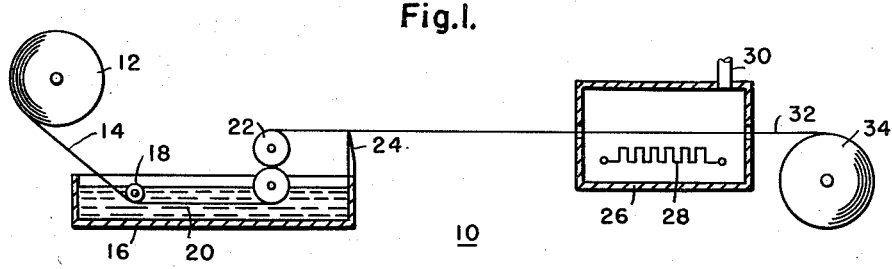
Figure 1 is a view in elevation, partly in section.

In accordance with the present invention, I have produced rolled laminated tubing of a density of more than 1.30 and with very low moisture absorption properties without the use of high-pressure molds. More specifically, I have discovered that paper may be treated with a combination of certain phenolic resins of such nature that when formed into a tube, the tube may be cured in an oven without pressure and will result in a high density product having low moisture absorption fully comparable with the best molded tube products produced heretofore.

For the purpose of this invention, there are combined two phenolic resin varnishes, the first being a phenol-formaldehyde varnish of a viscosity of 200 to 350 centipoises comprising a phenolic resin dissolved in an organic solvent, and the second being a phenolic resin dissolved in water, this latter aqueous varnish having a viscosity of from 200 to 500 centipoises. The varnishes may be dissolved in proportions to provide from 30% to 70% by weight of the first phenolic resin and from 70% to 30% by weight of the second phenolic resin. Both of the solutions contain over 40% by weight of resin solids therein, the resin solids in each case being A-stage phenol-formaldehyde reaction products in a potentially reactive form.

The first varnish may be prepared by reacting formaldehyde with a phenol selected from the group consisting of phenol, cresols, cresylic acid, xylenols, and alkyl-substituted phenols, or mixtures of any two or more. The best results have been secured by using phenol (hydroxy-benzene). For each mol of the phenol, there is provided from about 1 to 1.5 mols of formaldehyde or a reactive methylene polymer of formaldehyde such, for example, as paraformaldehyde or other trioxymethylene or mixtures of two or more. An alkaline catalyst such, for example, as alkali metal and alkaline-earth metal hydroxides and carbonates, or ammonia or organic amines may be employed to catalyze the reaction of the phenol-formaldehyde. The reaction is carried out in a conventional reaction vessel provided with condensers, stirrers, and the like, under reflux and subsequent vacuum dehydration until there is produced an A-stage resin having a viscosity of from 200 to 350 centipoises for a solution, in an organic solvent, of from 40% to 50% resin solids content. The set time for the varnish should be from 11 to 15 minutes.

A particularly satisfactory phenolic resin for the purpose of this invention is the product described in Weltman Patent 2,383,430. The phenolic resin there produced results from the reaction of phenol and formaldehyde, in proportions providing from 1 to 1.5 mols of formaldehyde per mol of phenol, reacted by refluxing first with from ⅛% to 1% based on the weight of the phenol, of a catalyst consisting of an alkali hydroxide and then neutralizing the alkali hydroxide and introducing ammonium hydroxide as a catalyst to complete the reaction.

The first phenolic resin so produced is dissolved in an organic solvent. While many organic solvents may be employed in the practice of the invention, alcohol or mixtures of alcohol and other organic solvents are particularly desirable since they are compatible or miscible with the water of the second phenolic resin.

*Example I*

A suitable example of the first phenolic resin is prepared as follows: 1000 parts by weight of phenol (hydroxybenzene) are introduced into a reaction vessel with 800 parts by weight of 40% aqueous formaldehyde solution and 5 parts by weight of sodium hydroxide. After refluxing the mixture for approximately ½ hour, the reaction product is evacuated for from 5 to 15 minutes at a vacuum of at least 15 inches of mercury in order to remove any excess or unreacted formaldehyde and a part of the water in the mixture. Then there is introduced into the reaction mixture ammonium sulphate in an amount stoichiometrically equal to the sodium hydroxide to form a precipitate of sodium sulphate. Additional ammonium hydroxide is also introduced in an amount of 30 parts of 30% aqueous ammonia solution. The reaction mixture is maintained at a temperature of approximately 70° C., and the reaction contents are stirred for ½ hour. A vacuum of at least 15 inches of mercury is then applied to the reaction vessel in order to remove the water from the reaction product. The temperature is increased gradually in order to cause the moisture and other volatiles to be more readily removed. At the end of approximately 2 hours, the temperature of the reaction vessel is approximately 110° C., and the vacuum may be above 22 inches of mercury, and the phenol-formaldehyde resin is of a thick, viscous consistency with substantially no moisture therein. Into the phenolic resin in the kettle, there is admixed 1000 parts by weight of a solvent consisting of 80% ethyl alcohol and 20% by weight of benzol. The mixture is thoroughly stirred to form a uniform varnish, cooled, and then the varnish is centrifuged which removes the sodium sulphate precipitate as well as any other solids, and the clear varnish is ready for use.

The second phenolic resin is the reaction product of phenol (hydroxybenzene) and formaldehyde or a reactive polymer of formaldehyde such as paraformaldehyde in the proportions of 1 mol of phenol to from 1 to 1.25 mols of the aldehyde reacted under certain critical conditions to produce a water soluble A-stage phenolic resin. The phenol and aldehyde must be reacted by refluxing in the presence of from 0.2% to 5% by weight, based on the weight of the phenol, of an alkaline catalyst selected from the group consisting of alkali metal and alkaline-earth metal oxides and hydroxides and alkali metal carbonates. Examples of suitable catalysts are sodium hydroxides, sodium carbonate, calcium oxide, barium oxide, calcium hydroxide, strontium hydroxide, potassium carbonate and lithium hydroxide. The refluxing should be carried out in the presence of a refluxing liquid comprising substantial amounts of water or other volatile liquid boiling between 80° C. and 125° C., the liquid being substantially non-reactive. The amount of water or other refluxing liquid may be as little as 10% to 15% of the weight of the reactants and at the other extreme may be equal to 5 times the weight of the reactants. Examples of such refluxing liquids are butanol, aqueous ethanol, diethyl Cellosolve, propyl alcohol, aqueous propyl alcohol, sec-butyl acetate, propyl acetate and naphtha. Water is preferred because of its availability and reduced fire hazard. The use of aqueous formaldehyde will introduce sufficient water in the order of 50% of the weight of the reactants.

The mixture of phenol and formaldehyde is refluxed for a period of from ½ hour to 2 hours, if water is the refluxing liquid, the longer time being employed with the smaller amounts of catalyst and the shorter period of time with the larger amounts of the catalyst. The reflux time also is inversely proportional to the reflux temperature. With an 80° C. reflux temperature, the time may be as much as 4 hours, while with a 125° C. reflux temperature, the time may be slightly less than ½ hour. The refluxing is preferably continued until the viscosity of a 50% water solution is above 50 centipoises and preferably carried out until the phenolic resin begins to separate from the water. Then the resinous reflux product is dehydrated under a vacuum of from 15 to 28 inches of mercury and to a temperature of from 60° C. to 125° C. until a substantially water-free phenolic resin of a viscosity of from 1,000 to 12,000 centipoises at a test temperature of 25° C. is produced. The resinification of the phenol and aldehyde is greatly advanced during the dehydration so that it results in a relatively thick resinous body constituting an A-stage phenolic resin which becomes water soluble in this range of viscosities. During dehydration water produced during condensation is removed along with the refluxing liquid. Finally, to produce an aqueous varnish solution, there is added to the dehydrated phenolic resin from 15 to 25 parts of water for each 85 to 75 parts by weight of the resin. More water can be employed, but is not necessary. Stirring of the resin and water will produce a stable, low viscosity phenolic resin solution, hereinafter designated as a varnish or aqueous varnish, suitable for application. Any phenol other than hydroxybenzene will not produce the water soluble A-stage resin of the type herein desired.

I have used ordinary tap water as well as distilled water in producing satisfactory varnish solutions. By "water" I intend to designate not only distilled water but water containing small amounts of salts, dissolved organics, alcohol and the like which do not impair the varnish.

A specific example of the second or aqueous varnish is set forth in the following example.

*Example II*

One mol of phenol (hydroxybenzene) was admixed with 1.1 mols of aqueous 37% formaldehyde and 1%, based on the weight of the phenol, of calcium hydroxide. The mixture was refluxed for one hour. The reaction mixture was dehydrated under a vacuum reaching a value of 22 inches and the temperature of the reaction product increasing to 95° C. The viscosity of the water-free phenolic resin was between 2000 and 3000 centipoises at 25° C. When 20 parts of water were added to each 80 parts by weight of the resinous product, a varnish having a viscosity of about 250 centipoises at 25° C. was secured.

Referring to Figure 1 of the drawing, there is illustrated apparatus 10 for the treatment of paper with the resinous composition of the present invention. A roll 12 of paper comprising a sheet of paper 14, the paper being either kraft paper or alpha-cellulose paper or an equivalent strong paper, is disposed at one end of the apparatus 10. The sheet of paper 14 is withdrawn from the roll 12 and passes into a varnish dip pan 16 beneath a roller 18 immersed in the phenolic resin varnish mixture 20 comprising from 30% to 70% of phenolic resin in the first varnish and from 70% to 30% by weight of phenolic resin in the second aqueous varnish, so that the paper 14 is soaked in the phenolic varnish mixture. The paper is withdrawn from the varnish mixture 20 and passes between a pair of squeeze rolls 22 where the amount of applied phenolic varnish is controlled by the setting of the rolls. The bottom side of the strip of treated paper is finally drawn over a scraper 24 so as to remove any adhering superficial phenolic varnish from that one side of the paper. The strip of paper with the applied phenolic varnish then passes into an oven 26 having electrical heating elements 28 or other suitable heating means where the solvent from the varnish is evaporated, and the phenolic resins on the sheet are advanced in cure to the B stage. Solvent vapors escape through the stack 30 of the oven. The product withdrawn from the oven is a sheet 32 of paper carrying B-stage phenolic resin and may be formed into a roll 34 for storage, cut, or otherwise handled.

Figure 2:
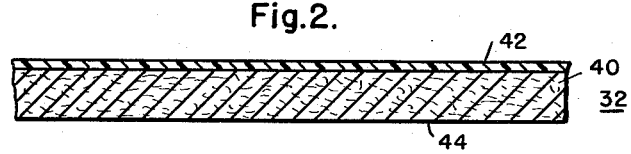
Figure 2 is an enlarged fragmentary cross section through a sheet of paper treated with the B-stage phenolic resin.

As illustrated in enlarged cross section in Figure 2, the treated sheet 32 comprises a body 40 impregnated with phenolic resin in the B-stage and carrying on its upper surface a thin surface layer 42 of phenolic resin while the bottom surface 44 of the sheet is substantially free from any superficial phenolic resin. It is desirable that the sheet 32 carry B-stage phenolic resin in an amount equal to from 100% to 150% of the weight of the paper. The best results have been obtained when the amount of the applied phenolic resin equals 115% to 130% of the weight of the paper.

Figure 3:
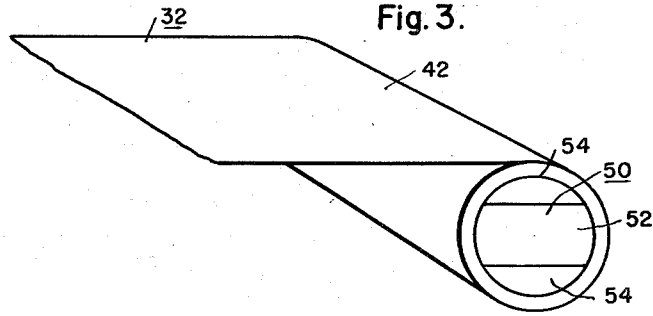
Figure 3 is a view in perspective of a tubing rolled.

Thereafter, the sheet 32 of paper with the applied B-stage phenolic resin is rolled on a mandrel into a tube with as many plies or turns as desired. Referring to Figure 3 of the drawing, there is illustrated schematically this stage of the process. The sheet of paper 32 is rolled on a collapsible steel mandrel 50 comprising a longitudinally wedge-shaped center section 52 that cooperates with two cooperating longitudinally tapered segments 54. The surface of the mandrel 50 is initially provided with a layer of cellophane or another parting medium to enable the ultimate formed tubing to be separated readily therefrom. As illustrated, the sheet 32 is wrapped about the mandrel so that the surface layer of resin 42 on the sheet of paper is disposed on the outward surface of the tube. In rolling the sheet of paper 32 on the mandrel 50, as much tension and pressure should be applied as is possible without tearing the paper.

Figure 4:
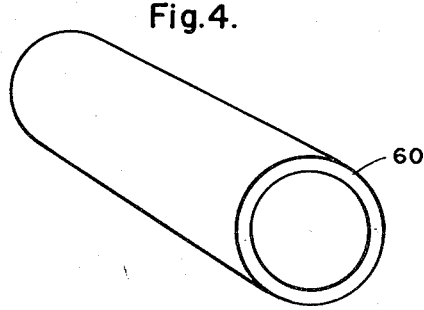
Figure 4 is a perspective view of a finished tube.

The mandrel with the wrapped sheet 32 applied thereon to a suitable thickness is then put into an oven heated to a temperature of from 140° C. to 160° C., or higher if desired. In a period of time of from 30 minutes to several hours, depending on the temperature, the thickness of the tubing on the mandrel, and other factors, the B-stage phenolic resin will have first fused and then hardened into a C-stage phenolic resin by means of which the paper laminations of the rolled tube are united into a high-density, bonded structure. Thereafter, the mandrel may be removed by withdrawing the section 52 partially so that the segmental sections 54 collapse and the tube is separated therefrom. Ordinarily, there will be very little processing required in order to produce the fully cured, laminated tube 60 as illustrated in Figure 4 of the drawing. The outer surface may or may not be machined or ground. However, the amount of machining required will be far less than that required with a molded tube.

It will be appreciated that solid mandrels as well as other forms of collapsible mandrels many be employed.

The density or specific gravity of tubes produced in accordance with the present invention will vary from 1.33 to 1.35 and even higher. The water absorption ordinarily will be less than 1.5%. It has been found that the dielectric strength of tubes produced in accordance with the present invention is substantially higher than that obtained from tubing produced by either of the previously known procedures; for example, I have obtained dielectric strengths of the order of 750 volts per mil whereas similar tubes prepared by previously known rolling procedures will have dielectric strengths of only from 450 to 650 volts per mil.

The following example is illustrative of the invention.

*Example III*

A resin mixture was prepared by combining sufficient of the varnish of Example I to provide 50 parts by weight of the phenolic resin, the solution in that instance having a viscosity of approximately 300 centipoises and a set time of from 13 to 15 minutes, and sufficient of the aqueous varnish of Example II to provide 50 parts by weight of the second phenolic resin, the latter varnish having a set time of from 12 to 14 minutes. Kraft paper of a thickness of 0.0035 inch was treated in the resin mixture in a single dip to provide on the paper 115% phenolic resin in the B stage based on the weight of the paper. After curing in an oven to convert the applied varnishes to the B stage, the sheet of paper had a greenness of approximately 8% when tested in accordance with the test described in Patent 2,383,430. The paper was then rolled on a steel mandrel and cured in an oven at 140° C. for 1 hour. The resulting laminated tubing had a specific gravity of 1.34.

A tube made in accordance with the procedure of Example III using only the varnish of Example I for treating the kraft paper, had a density of 1.28. When the latter rolled tube was cured in dies in a press instead of an oven at a pressure of 1000 p. s. i. for ½ hour, the density of the tube was 1.34. However, the molded tube had a pronounced seam and required the removal of considerable material by machining to produce a round, smooth outer surface.

The water absorption, after 24 hours immersion in water, of the tube produced in accordance with the present invention was 1.3%. The water absorption of the tube produced in accordance with the rolling procedure of Example III produced with only the resin of Example I had a water absorption of 3.5%. The press molded tube produced with the resin of Example I referred to above hand a moisture absorption of 1.9%.

It has been found that when either of the resins employed in the mixture are used alone in preparing a rolled tube, the oven cured rolled tube has a low density of less than 1.30 and a high moisture absorption. Therefore, it is highly unexpected that the mixture of the two resins would produce a high-density rolled tubing with low moisture absorption. The quality of the tubing produced in accordance with the present invention is equal to or surpasses the best products produced either by high-pressure molding or by any other technique suggested heretofore. Moreover, the present process is simple, economical, rapid, and convenient.

While the present invention has been described with respect to tubes of circular cross section, it should be understood that tubes having other cross sections, such as octagonal, hexagonal, elliptical, or the like, may be produced in a similar manner with equally satisfactory results.

Since certain obvious changes may be made in the above procedure and different embodiments of the invention could be made without departing from the scope thereof, it is intended that all matter contained in the above description shall be interpreted as illustrative and not in a limiting sense.

I claim as my invention:

1. In the process of preparing rolled phenolic resin-bonded paper tubing, the steps comprising impregnating a sheet of paper with a phenolic resin varnish of a viscosity of from 200 to 400 centipoises, the varnish comprising a mixture of from 30% to 70% by weight of a phenolic resin dissolved in a volatile organic solvent and the solution being of a viscosity of from 200 to 350 centipoises, and from 70% to 30% by weight of a phenolic resin dissolved in water and the solution being of a viscosity of from 200 to 500 centipoises, each of the phenolic resin solutions forming the mixture containing over 40% resin solids, the varnish mixture after having been applied being scraped off one face of the sheet of paper, the treated sheet being heated to evaporate the organic solvent and the water and to advance the phenolic resin to the B stage, the weight of the applied phenolic resin equal to from 100% to 150% of the weight of the paper, the phenolic resin thoroughly impregnating the paper, wrapping the treated sheet of paper on a mandrel with the scraped side being down to form a tubular structure, and heating the mandrel with the wrapped sheet thereon to bond the paper together and to convert the phenolic resin to the infusible insoluble stage, the resulting tube when removed from the mandrel having a density of over 1.30.

2. The process of claim 1 wherein the amount of the applied phenolic resin equals from 115% to 130% of the weight of the paper.

References Cited in the file of this patent

UNITED STATES PATENTS

| Number | Name | Date |
|---|---|---|
| 1,284,296 | Frederick | Nov. 12, 1918 |
| 2,001,031 | Landt | May 14, 1935 |
| 2,066,991 | Lutz | Jan. 5, 1937 |
| 2,190,672 | Meharg | Feb. 20, 1940 |
| 2,351,716 | Smith | June 20, 1944 |
| 2,433,643 | Beach et al. | Dec. 30, 1947 |